United States Patent [19]
Phillips

[11] Patent Number: 5,297,477
[45] Date of Patent: Mar. 29, 1994

[54] EDUCATIONAL EGG ART TOY

[76] Inventor: Bert Phillips, R.D. 1, Box 107G, Spring Mills, Pa. 16875

[21] Appl. No.: 27,428

[22] Filed: Mar. 8, 1993

[51] Int. Cl.⁵ .......................... A23B 5/00; A23N 1/00; A47J 43/14; B02B 3/00
[52] U.S. Cl. ........................................ 99/495; 99/532; 99/568; 434/81
[58] Field of Search .................... 99/495, 568, 532; 434/81

[56] References Cited

U.S. PATENT DOCUMENTS

| | | |
|---|---|---|
| 2,224,941 | 9/1948 | Weimer . |
| 2,445,490 | 7/1948 | Meade . |
| 2,466,310 | 4/1949 | Gaylor . |
| 2,466,812 | 8/1949 | Cribb et al. . |
| 2,594,619 | 4/1952 | Bosch et al. . |
| 2,800,409 | 7/1957 | Webb et al. . |
| 3,055,407 | 9/1962 | Conrad . |
| 3,855,915 | 12/1974 | Hoyt et al. ............... 99/495 |
| 3,951,055 | 4/1976 | Woebbeking ............ 99/568 |
| 3,958,505 | 5/1976 | Baker ...................... 99/495 |
| 4,117,774 | 10/1978 | Wilburn et al. .......... 99/568 |
| 4,182,234 | 1/1980 | Reed ....................... 99/495 |
| 4,344,359 | 8/1982 | Frechou et al. .......... 99/568 X |
| 4,961,946 | 10/1990 | Shimizu ................... 99/568 X |
| 5,197,380 | 3/1993 | Fisher ...................... 99/568 X |

FOREIGN PATENT DOCUMENTS 2702157 7/1978 Fed. Rep. of Germany ........ 99/495

Primary Examiner—Gene Mancene
Assistant Examiner—Cindy A. Cherichetti
Attorney, Agent, or Firm—Lewis L. Lloyd

[57] ABSTRACT

The apparatus includes a tube for inserting into an egg having one hole in the shell. The tube extends into the shell through the egg yoke and egg white until one end contacts the inside surface of the shell opposite the hole. The tube is connected to a squeeze bulb air supply. A chute is positioned below the hole around the tube. When the squeeze bulb is squeezed air is supplied to exit the one end inside the shell. The air causes the content of the egg yoke and egg white to flow out the hole around the tube into the chute. In the alternative embodiment the end of the tube is formed with an air relief to facilitate air flow into the shell when the end of the tube is in contact with the inside surface of the shell. The empty egg shell is then used for "Egg Art".

9 Claims, 2 Drawing Sheets

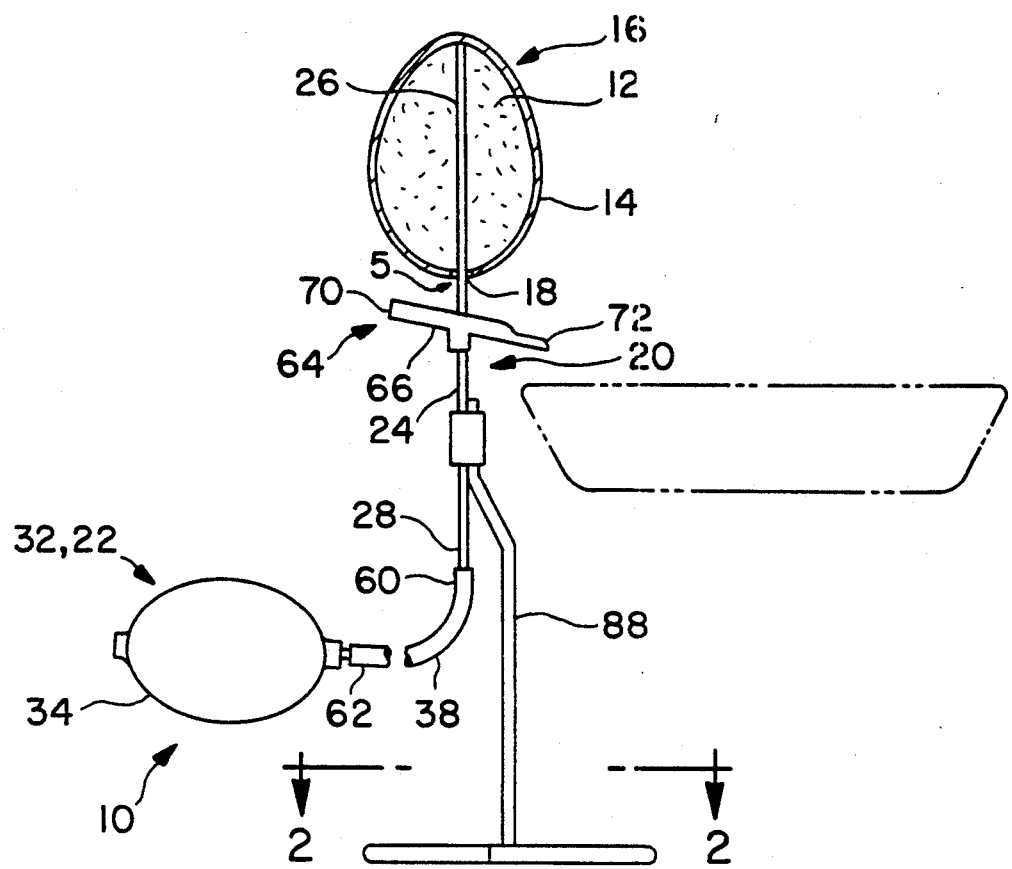
FIG. 1
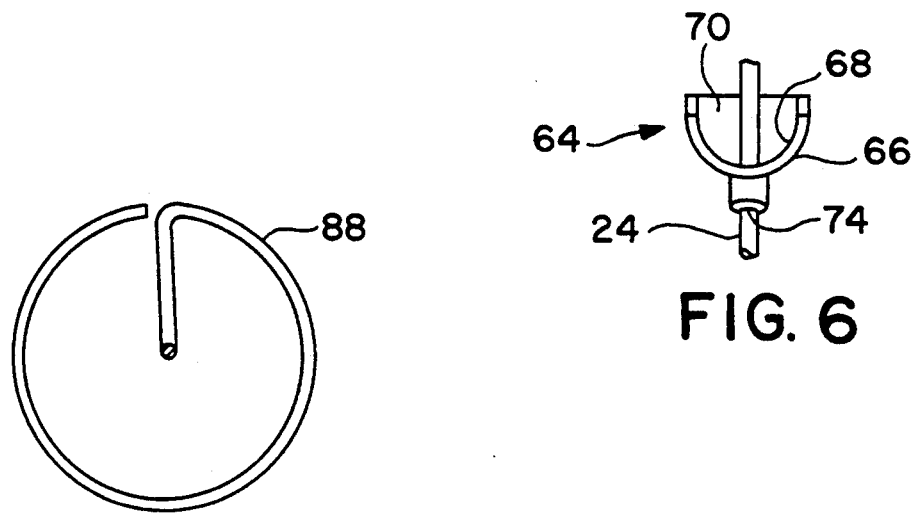
FIG. 2
FIG. 6

EDUCATIONAL EGG ART TOY

BACKGROUND OF THE INVENTION

This invention relates to an apparatus for removal of the content of an egg and particularly concerns a toy apparatus for removal of the content of an egg from the shell of the egg through a single hole formed in the egg shell to provide an empty egg shell and is an Educational Toy for preparing "Egg Art".

Many the prior devices are used to collect the content of egg shells and as a result they crack or otherwise damage the egg shell thereby preventing its use in decorative "Egg Art". Other prior devices which empty the egg shell of content for use of the egg shell result in multiple holes in the shell or are complex or are not directed to providing a simple toy apparatus that can be easily operated.

SUMMARY OF THE INVENTION

The invention is an Educational Toy for preparing an egg shell for use as "Egg Art". The toy is a simple apparatus which is used to remove the content of an egg from an egg shell having only one hole in the shell of the egg. Since the egg shell contains only one hole which is used by the toy apparatus to remove the content and empty the egg shell, the invention results in an egg shell which can be used for "Egg Art". In other words,, the empty egg shell can be decorated as an art object. It can be traditionally decorated for Easter and Christmas or it can be used for creative "Egg Art". The simple toy apparatus makes it possible to use the empty egg shell for "Egg Art" since a single small hole in the egg shell does not detract from the resulting decorative "Egg Art". The simple toy apparatus also provides for collection of the egg content in a manner which educates the user on principles of air pressure and how these principles are used to simply empty an egg shell of content through a single small hole in the shell.

The toy apparatus for removal of the content of an egg through one hole in the shell of the egg includes a hollow needle having an outside smaller than the one hole in the shell inserted therethrough with the first end of the hollow needle adjacent the content of the egg and the second end of the hollow needle outside the shell, and an air supply means for supplying air to exit the first end of the hollow needle into the content of the egg so that the content is forced out the one hole around the smaller outside of the hollow needle.

The toy is not complicated and it is very easy to learn to operate. In use, the content of the egg is removed in a few seconds. In the preferred embodiment of the invention the air supply means is a squeeze bulb for supplying air to the hollow needle. In use it takes one or two squeezes of the squeeze bulb to supply sufficient air into the egg shell to empty the egg of its content. The squeeze bulb provides an air supply that is low cost, small in size, and easy to operate. The squeeze bulb also provides for a compact toy which is self contained and which easily can be carried for use anywhere. The toy can be contained in a small package and sold at a cost that is affordable by everyone.

The contemplated principal purpose of the invention is an Educational Toy. It can be used to provide an empty egg shell for decoration as "Egg Art". In providing the decorative egg shell the egg white and yoke can be collected and used for cooking and baking.

The use of the toy is fun as well as educational. Watching someone use the toy apparatus is also fun and provides for the amusement and pleasure of both adults and children. These and other advantages are very apparent from the following description and drawings.

BRIEF DESCRIPTION OF THE DRAWINGS

FIG. 1 is a side elevation view illustrating the toy apparatus for removal of the content of an egg through one hole in the shell of the egg.

FIG. 2 is a top elevation view on section 2—2 of the lower portion of a stand for the apparatus of FIG. 1.

FIG. 6 is a side elevation view on section 6—6 of the apparatus of FIGS. 1 and 3 particularly illustrating the content catching chute means.

DETAILED DESCRIPTION OF THE INVENTION

Figure 4:
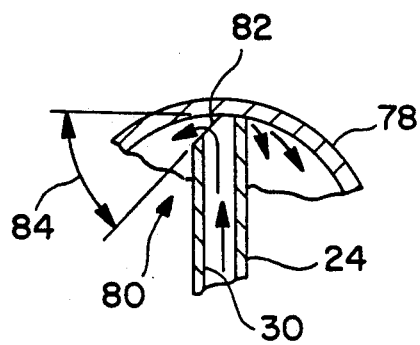
FIG. 4 is a further enlarged view of the portion of the apparatus of FIGS. 1 and 3 particularly illustrating the relief means in the first end of the hollow needle means.

FIG. 1 illustrates the Educational Toy or toy apparatus 10 for removal of the egg yoke and egg white or content 12 from the egg shell 14 of an egg 16 through one small hole 18 in the shell 14 of the egg 16.

The apparatus 10 includes tube means 20 and air supply means 22 for removal of the content 12 from the egg 16. The tube means 20 includes a tube or hollow needle 24. The hollow needle 24 has a hollow needle first end or air exit 26, a hollow needle second end or air entrance 28 and a hollow needle longitudinal hole or passageway 30. In the preferred embodiment, the hollow needle 24 has an outside diameter of about 0.060 inch, an inside diameter of about 0.040 inch and a length of about 4 inches. The hollow needle 24 is a rigid or semi-rigid tube. A suitable hollow needle 24 is the type used in a hypodermic device. The hole 18 has a diameter of about 0.125, therefore the hollow needle 24 is smaller on the outside than the hole 18 or the hole 18 is larger than the outside of the hollow needle 24. This provides for a clearance or space S in the hole 18 around the hollow needle 24. The content 12 flows out of the egg 16 through this clearance or space S.

The air supply means 22 includes a squeeze bulb air supply means 32. The squeeze bulb air supply means 32 shown in FIGS. 1 and 5 includes a squeeze bulb or bulb 34, check valve means 36, and a supply tube 38. The bulb 34 has a first bulb end opening or air entrance opening 40, a second bulb end opening or air exit opening 42 and a central bulb portion 44. The bulb 34 includes an air cavity 46 within the bulb portion 44, a first air passageway 48 in the air entrance opening 40 that connects into the air cavity 46 and a second air passageway 50 in the air exit opening 42 that connects from the air cavity 46.

The preferred squeeze bulb 34 is about one and one-half inches long and about 1 inch in diameter. It is believed that the volume of air supply held by the squeeze bulb is approximately one-half to one times the volume of an average size chicken egg. This air supply is held at about atmospheric pressure and when the squeeze bulb 34 is squeezed this air supply is pressurized above atmospheric pressure. It is the air supply at the pressure above atmospheric pressure provided by the squeeze bulb 34 which is applied to the content 12 to force it out the hole 18.

Figure 5:
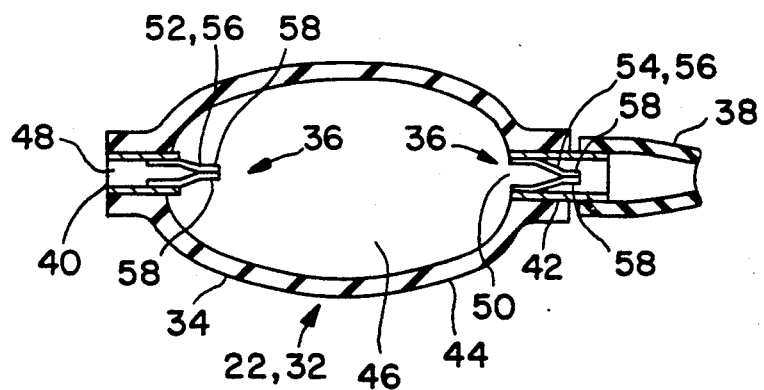
FIG. 5 is an enlarged view of a portion of the apparatus of FIG. 1 particularly illustrating the squeeze bulb air supply means.

The check valve means 36 as shown in FIG. 5 includes a first check valve 52 sealably positioned in the bulb air entrance opening 40 within the first air passageway 48 and a second check valve 54 sealably positioned in the bulb air exit opening 42 within the bulb second air passageway 50. The first and second check valves 52 and 54 are shown in FIG. 5 as a duck-bill type check valve 56. The duck-bill type check valve 56 includes two long elements 58 which are spread apart when air flows one direction and which close when air attempts to flow in the other direction. A ball type check valve may be used but it is more restrictive in air flow. When bulb 34 is squeezed the second check valve 54 is opened, the first check valve 52 is closed and the air supply in the air cavity 46 is forced to flow out the second check valve 54. When the fully squeezed bulb 34 is released, the second check valve 54 is closed, the first check valve 52 is open and atmospheric air fills the bulb 34. Accordingly, each squeeze and release of the bulb 34 provides a supply of air through the hollow needle 24 against the content 12 of the egg 16.

In the preferred embodiment, the supply tube 38 as shown in FIG. 1 is a flexible tube which includes a supply tube first end 60 and a supply tube second end 62. The first end 60 connects to the hollow needle first end 26 and the second end 62 connects to the bulb second end opening or air exit opening 42.

Figure 3:
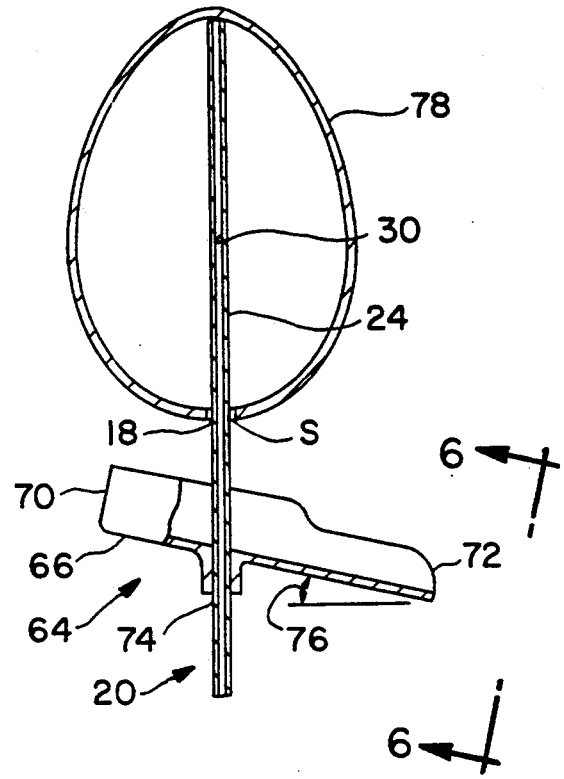
FIG. 3 is an enlarged view of a portion of the apparatus of FIG. 1 particularly illustrating the hollow needle means and content catching chute means.

The apparatus 10 also includes a content catching means 64 as shown in FIGS. 1, 3 and 6. The content catching means 64 includes a content catching chute 66. The content catching chute 66 has a chute portion formed in a U-shape 68 with a first closed end 70 and a second open end 72. An opening 74 is formed about central to the U-shape 68 and about midway along the length of the chute 66. The opening 74 is formed at an angle 76. As shown in FIG. 3, the chute 66 is positioned over the hollow needle 24 with the hollow needle 24 passing through the opening 74.

Since the opening 74 is formed at an angle 76, the chute 66 is positioned on the hollow needle 24 at a downward direction with the first closed end 70 at the top (or up) and the second opening end 72 at the bottom (or down) when the hollow needle 24 is in a vertical position. This permits the content 12 as it flows out of the hole 18 in the shell 14 through the space S around the hollow needle 24 to continue to flow down the chute 66 for collection. The chute 66 is a slip fit with opening 74 over the hollow needle 24 to permit adjustment of the position of the chute 66 closer or further from the hole 18 in the shell 14 when the hollow needle 24 is inserted into the hole 18. This adjustment may be necessary to accomodate different size eggs or to position the chute 66 sufficiently close to the hole 18 to insure that when the air supply forces the content 12 from the egg 16 it flows into the chute 66.

Referring to FIG. 4, the hollow needle first end 26 includes relief means 80. In the preferred embodiment the relief means 80 is a cut 82 across the hollow needle first end 26 at an angle 84 of about 45 degrees to remove a portion of the side 86 of the hollow needle 24. The removed portion opens and exposes an area of the passageway 30 at the first end 26. When the hollow needle 24 is positioned against the inside surface of the shell 14 about opposite the hole 18, the hollow needle first end 26 may be in contact with the inside of the shell 14. The relief means 80, by exposing the side 86 of passageway 30, permits air flow to exit the hollow needle first end or air exit 26 into the content 12 to force the content 12 out of the shell 14 as will be described.

The apparatus 10 is simple to operate. In the preferred embodiment, the apparatus 10 is hand held. Where the convenience of resting the apparatus 10 on a table is a vertical orientation is desired a support such as stand 88 may be optional to the apparatus 10.

To operate the apparatus 10 an egg 16 with a preformed hole 18 is used. Where the empty shell 78 is to be used for Easter or Christmas decoration as "Egg Art", it is best that the hole 18 is formed or preformed in the larger end of the egg 16. Where the apparatus 10 is hand held, the hollow needle 24 is inserted into the hole 18. In the preferred embodiment, the hollow needle 24 is inserted until the first end 26 is about adjacent the inside of the shell 14 about opposite the hole 18. Where the hole 18 is in the larger end of the egg 16, the first end 26 of the hollow needle 24 is inside the shell 14 adjacent the small end of the egg 16. The apparatus 10 is adjusted to orient the content catching chute 66 so that it is below the hole 18 and positioned to catch the content 12 of the egg. The squeeze bulb 34 is squeezed to supply air into the hollow needle 24. The air supply exits the first end 26 of the hollow needle 24 to cause the content 12 to flow out the hole 18 through the space S around the hollow needle 24 into the chute 66. One or two squeezes and releases of the squeeze bulb 66 provides sufficient supply air to remove the content 12 of the egg.

In an alternative embodiment, the apparatus includes the stand 88. When the stand 88 is used the egg 16 is set-down with the hole 18 over the hollow needle 24 until the egg 16 is supported on the first end 26 of the hollow needle 24. The relief means 80 permits air flow to exit the hollow needle first end 26 to force the content 12 out of the space S between the hole 18 and the smaller outside of the hollow needle 24 around the hollow needle.

Although apparatus 10 is shown with a hollow needle 24 connecting to a supply tube 38 to the squeeze bulb 34, the squeeze bulb 34 can be connected directly to the hollow needle 24. Or a small rigid but bendable capillary tube can replace both the hollow needle 24 and the supply tube 38. In addition, although the one hole 16 is shown in the bottom of the shell 14, it can be in any location including the top or side to practice the present invention.

While embodiments and application of the invention have been described and shown, it would be apparent to those skilled in the art that modifications are possible without departing from the inventive concept herein. Therefore, the invention is not to be restricted other than by the scope and equivalence of the following claims.

I claim:

1. Apparatus comprising
a tube means for positioning through one hole in the shell of an egg, said tube means including a tube having a first end, a second end and a passageway therethrough, said tube extending generally vertical through said one hole in said shell into the content of the egg, said tube being smaller in diameter than said hole in said shell, said first end contacting the inside of said shell whereby said egg is supported on said first end, an air supply means for providing air flow into said second end of said tube, through said tube and exiting out said first end against said content whereby said air flow moves said content out said hole around said tube, and a content catching chute to collect the content of said egg as it flows out said hole around said tube.

2. The apparatus defined in claim 1 wherein said air supply means comprises a squeeze bulb means air supply.

3. Apparatus comprising a tube means for positioning through one hole in the shell of an egg, said tube means including a tube having a first end, a second end and a passageway therethrough, said tube extending generally vertical through said one hole in said shell into the content of the egg, said tube being smaller in diameter than said hole in said shell, said first end including relief means, said first end contacting the inside of said shell at about opposite said hole whereby said egg is supported on said first end and said relief means permits air to exit said first end of said tube, and an air supply means for providing air flow into said second end of said tube, through said tube and exiting out said first end against said content whereby said air flow moves said content out said hole around said tube.

4. The apparatus defined in claim 3 wherein said air supply means includes a squeeze bulb air supply and a first one way valve permitting filling of said squeeze bulb with air each time said squeeze bulb is squeezed.

5. The apparatus defined in claim 3 wherein said air supply means includes a squeeze bulb air supply from an air entrance end, and a second one way valve preventing air from filling said squeeze bulb from an air exit end each time said squeeze bulb air supply is squeezed and released.

6. The apparatus defined in claim 3 wherein said content catching chute is of U-shape and contains an opening therein for sliding over said tube, said U-shape being positioned under said one hole in said shell.

7. The apparatus defined in claim 3 further including a stand means for mounting said tube means to establish said vertical orientation of said tube means.

8. The apparatus defined in claim 3 further including a stand means attached to support said tube means, wherein said content catching chute is positioned on said tube means at about a position below said hole when said tube is positioned in said hole in said egg.

9. The apparatus defined in claim 3 wherein said first end of said tube includes an opening through the side of said tube into said passageway for said flow of air into said shell.

* * * * *